Patented July 14, 1942

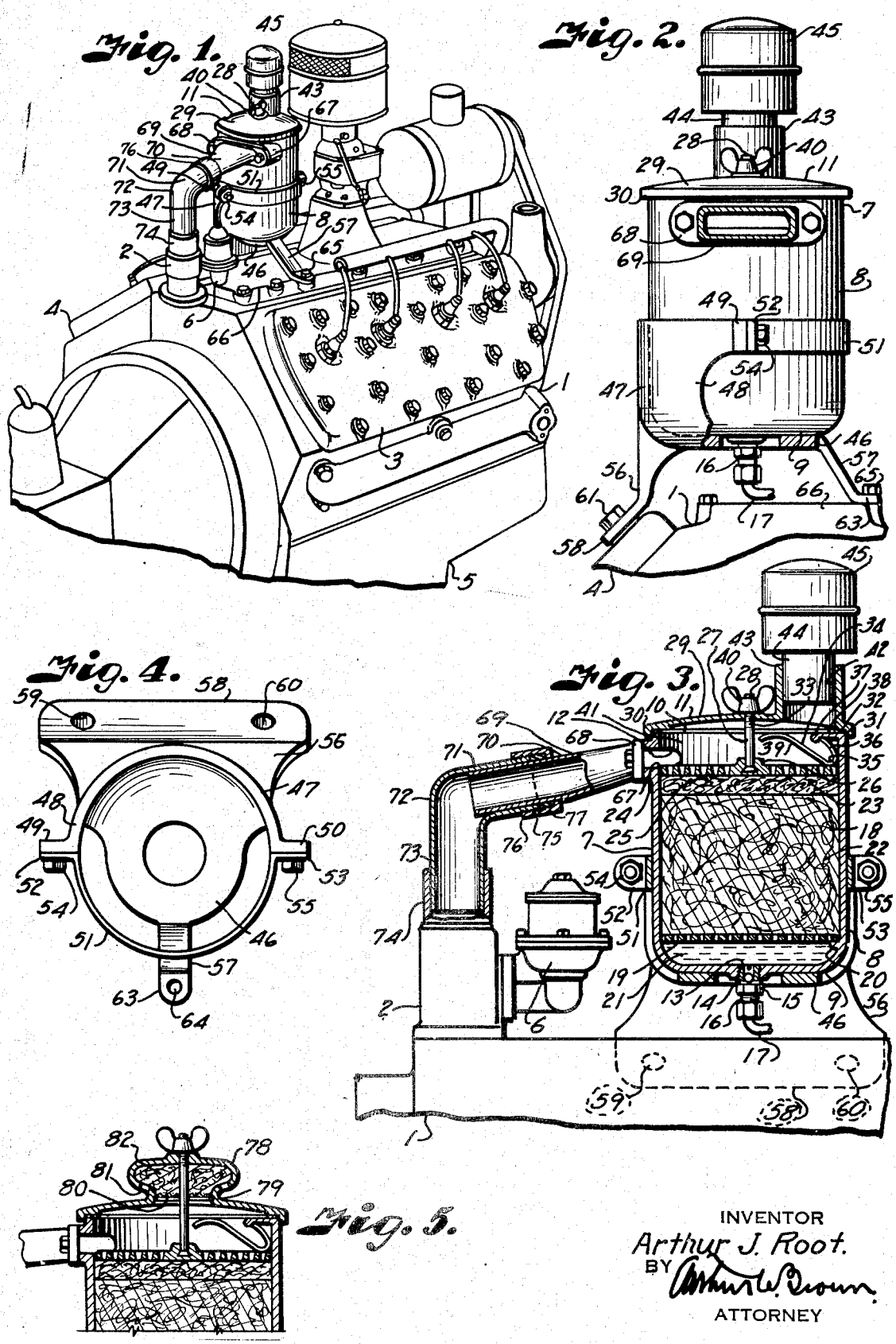

2,289,554

UNITED STATES PATENT OFFICE 2,289,554

OIL FILTER AND MOUNTING THEREFOR

Arthur J. Root, Quapaw, Okla.

Application December 4, 1939, Serial No. 307,455

2 Claims. (Cl. 210—131)

This invention relates to oil filters of the type illustrated in my copending application, Serial No. 290,805, filed August 18, 1939, and which is adapted for association with the ventilating system of the crank-case of an engine on which the filter is installed.

The filter covered in my copending application is mounted directly upon and carried by the oil filler and breather connection of the engine, however, I have found that in many engines there is not sufficient room to mount the filter on this connection.

It is, therefore, a principal object of the present invention to provide a filter construction and a universal mounting therefor so that the oil outlet is readily connectable with the oil filler and breather connection and the returned oil is contacted with air passing into the crank-case.

It is also an object of the invention to provide a filter mounting wherein the filtering unit is readily removable for replacement without detaching the filter.

In accomplishing these and other objects of the invention, as hereinafter pointed out, I have provided improved details of structure, the preferred form of which is illustrated in the accompanying drawing, wherein:

Fig. 1 is a perspective view of a portion of a well known motor vehicle engine equipped with a filter and filter mounting embodying the features of the present invention.

Fig. 2 is an elevational view of the filter and mounting, the oil outlet, and a portion of the mounting bracket being shown in section.

Fig. 3 is a longitudinal section through the filter and its telescoping connection with the oil filler and breather tube.

Fig. 4 is a plan view of the mounting bracket.

Fig. 5 is a sectional view through the upper portion of a modified form of the invention.

Referring more in detail to the drawing:

1 designates a well known type of internal combustion engine having an oil filler and breather connection 2 projecting above and located between the cylinder heads 3 and 4, and which leads downwardly to the interior of the crank-case 5. Because of the location of the conntion 2, and the relative closeness of the fuel pump 6, it is difficult to mount a filter directly upon the connection 2, as in the instance of the filter disclosed in the above mentioned application. I have, therefore, provided a universal mounting and a filter construction whereby the filter is located in a conveniently accessible position and connected with the breather and filler connection to give the advantages of the filter as described in my copending application.

The filter includes a casing 7, having a preferably cylindrical wall 8, a bottom 9, and an open top 10 normally closed by a cover 11. Formed in the side wall of the casing, at a point just below the rim of the opening 10, is an elongated horizontally arranged opening 12, as clearly shown in Figs. 2 and 3 to provide an oil outlet and flow passage for air that is drawn into the crank-case through the connection 2, as later described.

The bottom 9 is provided with a preferably centrally arranged opening 13 for receiving the threaded neck 14 of a check valve 15 forming a connection 16 for an oil supply pipe 17, the pipe 17 being connected with the pressure side of the oil circulatory system and forming a by-pass for passing a portion of the oil through the filter to be returned to the crank-case through the connection 2. The check valve 15 normally seats on drop in oil pressure to prevent return flow of the by-passed oil and foreign matter removed by the filtering media 18.

In the illustrated instance the filtering media is shown as being supported above the bottom of the filter casing on an apertured grid 19 carried upon lugs 20 projecting inwardly from the wall 8, thereby providing an inlet chamber 21 coextensive with the area of the filtering media.

The filtering media 18 may be in any approved cartridge form or a body of cotton waste 22 superimposed by a felt pad 23 which is retained against the waste and below the lower edge 24 of the oil outlet by an apertured grid plate 25, similar in construction to the grid 19. The grid plate 25 has a central boss 26, carrying an upwardly directed stem 27 terminating in a threaded end 28 by which the cover 11 is secured on the rim of the casing wall 8.

The cover 11 preferably includes a crowned disk portion 29 having a depending flange 30 engaging over the rim of the casing and cooperating with a shoulder 31 to seat a gasket 32. The center of the cover has an opening 33 for passing the threaded end of the stem 27 as shown in Fig. 3. The grid plate 25 is normally retained in position by a spring clamp 34, which includes a rounded fulcrum portion 35 seated on the grid plate and having a finger 36 engaged under a rib 37 on a web 38 extending inwardly from the rim of the casing. The clamp also includes a handle portion 39 by which the finger 36 may be rocked into engagement with the rib 37. With the clamp in position the cover may be secured by a wing nut 40 threaded on the projecting end of the stem 27.

In order that the air drawn into the crank-case may be passed through the outlet chamber 41 of the filter, the cover is provided with an air inlet opening 42 encircled by a collar 43 which receives the neck 44 of the conventional breather cap 45 that was previously mounted directly on the connection 2.

The filter mounting bracket includes a plate portion 46 conforming to the shape of the filter bottom 9, and an arcuate flange portion 47 cooperating therewith to form a seat in which the filter is supported. The sides 48 of the flange portion 47 terminate substantially at opposite diametrical sides of the filter casing in laterally extending ears 49 and 50 to attach a strap 51 which coacts with the flange 47 to encircle the body of the casing. The strap 51 has similar ears 52 and 53 through which fastening devices 54 and 55 are extended into threaded sockets in the ears 49 and 50. The bracket also includes depending legs 56 and 57 by which the bracket is attached to the engine. For example, the leg 56 is in the form of an elongated flange and terminates in a foot 58 provided with spaced openings 59 and 60 through which the cylinder head studs 61 are extended. The other leg serves principally as a brace and terminates in a foot 63 having an opening 64 therein through which is passed one of the fastening device 65 securing the manifold 66.

The leg portions of the bracket are preferably formed of bendable material so that they may be adjusted to fit the various places of attachment of the respective engines on which the filters may be installed.

Formed about the elongated outlet opening 12 is a boss 67 to which is secured the flange 68 of an outlet tube 69. The inlet end of the tube 69 corresponds in shape to that of the opening, but its discharge end terminates in a downwardly inclined tube portion 70 telescoped within a tubular branch 71 of an L-shaped tube 72, the other branch 73 of which sleeves within the collar 74 of the connection 2, as shown in Fig. 3. With this arrangement the telescoping connection provides sufficient adjustment to accommodate the filter mounting with respect to the breather and filler connection 2. If desired, the end of branch 71 may be threaded, as at 75, to mount a packing nut 76 which compresses a packing ring 77 into sealing contact with the tube 69 to prevent infiltration of air through the joint.

With the filter assembled and installed as described, oil is by-passed under pressure through the pipe 17 and discharged into the inlet chamber 21 for upward flow through the filtering media which removes the moisture diluents and solids entrained with the oil. The oil, after passing through the filter media and the upper grid plate, flows in a thin film through the outlet 12 through the connecting tubes and is returned to the crank-case by way of the connection 2. Simultaneously with flow of oil air is drawn through the breather cap 45 and into intimate contact with the oil being returned to the crank-case. This contact of the air causes evaporation of any liquid diluents that are carried with the oil through the filter media so that by the time the oil is returned to the crank-case it is relieved of foreign material. The evaporated liquid diluents on entering the warm zone of the crank-case remain as vapors and are carried out through the usual ventilating opening in the crank-case as in conventional practice.

In the form of the invention shown in Fig. 5, the breather cap is in the form of a dome 78 connected with the interior of the filter casing through a neck 79 which is covered by a screen 80. The dome 78 projects circumferentially of the neck 79 and the under part of the projecting portion is provided with air inlet openings 81. The interior of the dome is filled with a filtering media 82 so that the air drawn into the crank-case is relieved of dust, dirt, and other foreign material prior to contact of the air with the oil. Otherwise the filter construction and mounting are the same as that illustrated in the preferred form of the invention.

From the foregoing it is obvious that I have provided a simple filter construction that is adapted for universal mounting and readily connected with the filler and breather connection of an internal combustion engine.

What I claim and desire to secure by Letters Patent is:

1. In combination with the air inlet connection of the ventilating system of an internal combustion engine, a filter casing, means supporting the filter casing on the engine in laterally spaced relation with said air inlet connection, a filtering element supported in the casing and arranged therein to provide an oil inlet space below the filtering element and an air space above the filtering element, said filter casing having an oil inlet to the oil inlet space, an air inlet to the air space and a lateral oil and air outlet from said air space, and an L-shaped duct having a vertical leg connected with the air inlet connection and a lateral leg connected with the air and oil outlet of said casing whereby air is supplied to the air inlet connection of the ventilating system through said air space and in sweeping contact with filtered oil flowing through the lateral outlet opening and lateral leg of said duct to the air inlet connection of the ventilating system.

2. In combination with the air inlet connection of the ventilating system of an internal combustion engine, a filter casing, means supporting the filter casing on the engine in laterally spaced relation with said air inlet connection, a filtering element supported in the casing and arranged therein to provide an oil inlet space below the filtering element and an air space above the filtering element, said filter casing having an oil inlet to the oil inlet space, an air inlet to the air space and a lateral oil and air outlet from said air space, an L-shaped duct having a vertical leg connected with the air inlet connection and a lateral leg connected with the air and oil outlet of said casing whereby air is supplied to the air inlet connection of the ventilating system through said air space and in sweeping contact with filtered oil flowing through the lateral outlet opening and lateral leg of said duct to the air inlet connection of the generating system, said lateral leg of the duct comprising telescoping sections, and means sealing the joint between said sections.

ARTHUR J. ROOT.